UNITED STATES PATENT OFFICE.

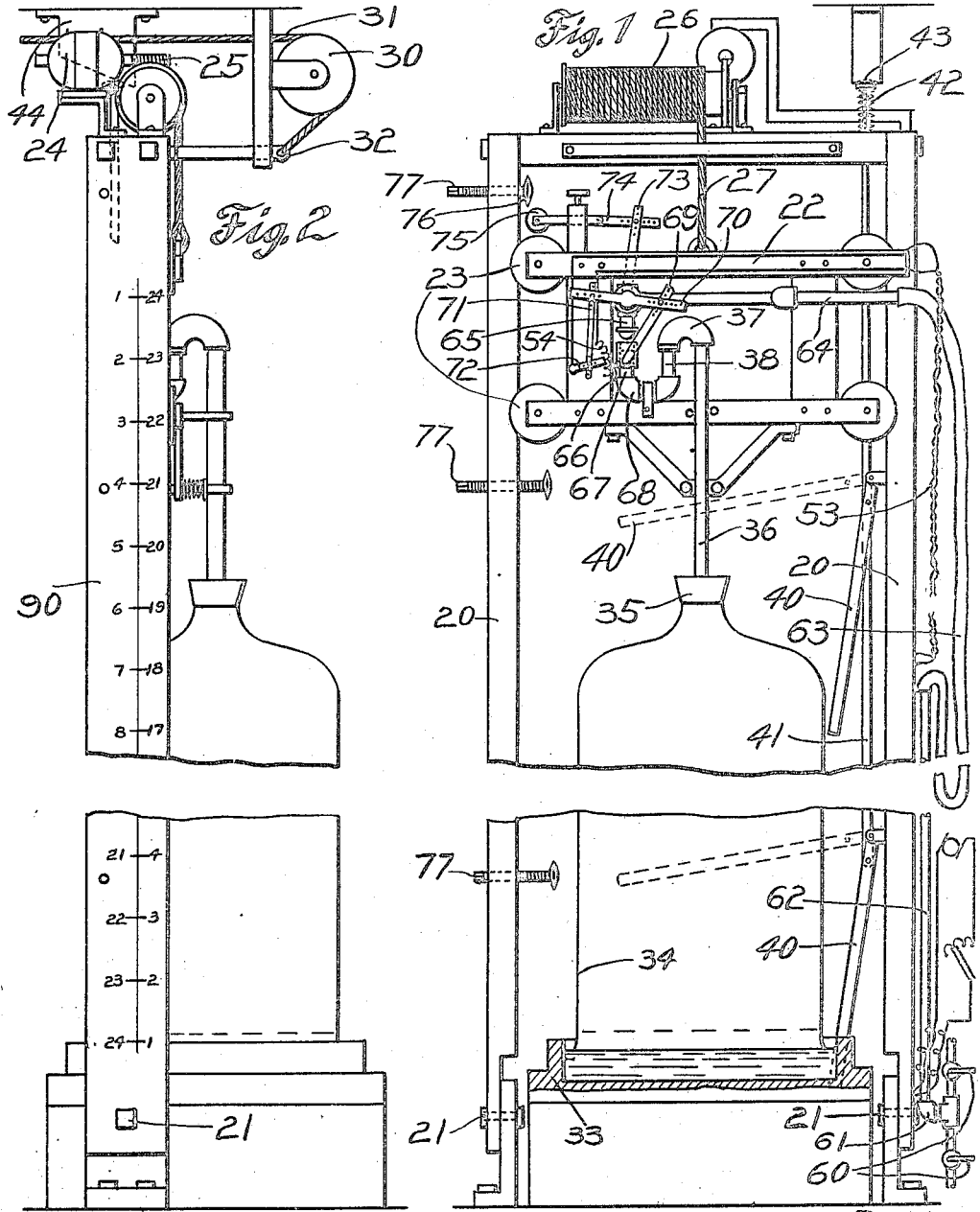

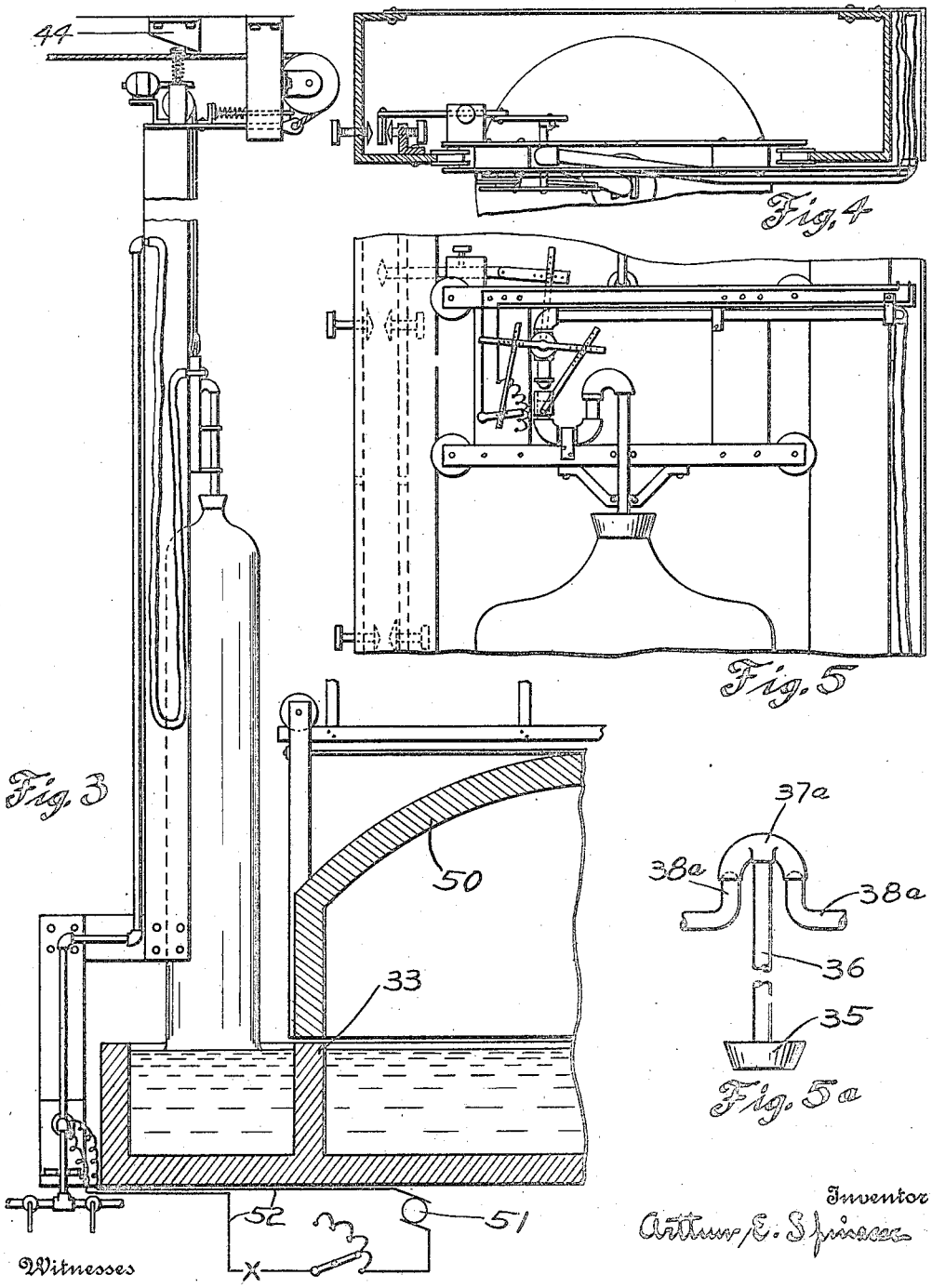

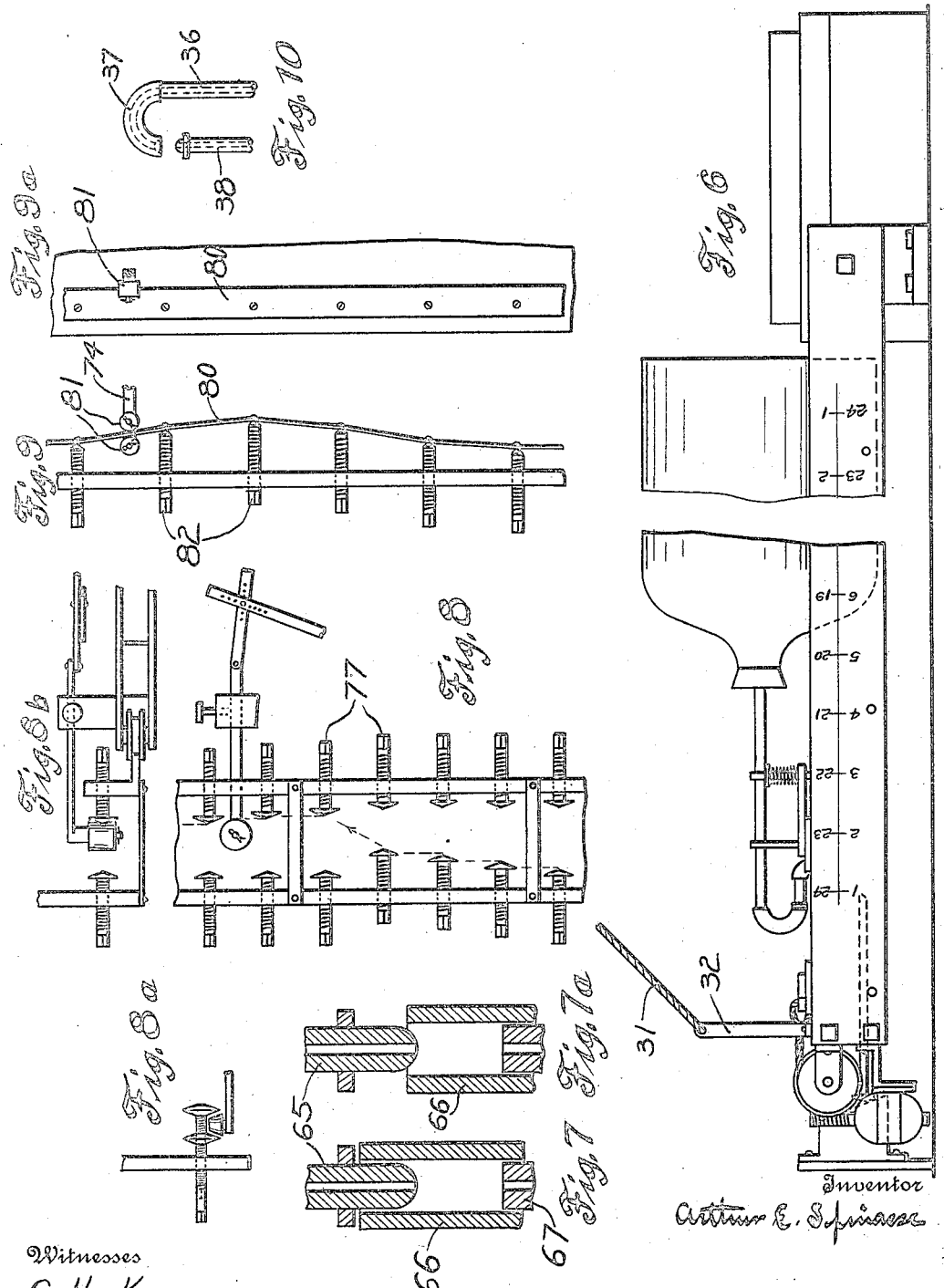

ARTHUR E. SPINASSE, OF MOUNT VERNON, OHIO.

GLASS-DRAWING APPARATUS.

1,224,082.  Specification of Letters Patent.  Patented Apr. 24, 1917.

Application filed May 24, 1911, Serial No. 629,121. Renewed March 8, 1917. Serial No. 153,585.

*To all whom it may concern:*

Be it known that I, ARTHUR E. SPINASSE, residing at Mount Vernon, Ohio, have invented certain new and useful Improvements in Glass-Drawing Apparatus, of which the following is a full, clear, and exact description.

This invention relates to improvements in glass drawing apparatus and has among its objects to provide a means for drawing a glass cylinder from molten glass and then when the cylinder has been drawn to its full extent, handling this glass cylinder in the most efficient manner with the least likelihood of breakage.

My invention relates to glass drawing apparatus, being primarily directed to the provision of an improved type of drawing apparatus designed to eliminate the necessity for the use of the present day take-down and at the same time render all of the parts of the drawing apparatus intermittently accessible for inspection and repair. My improvement also embraces apparatus whereby the speed or air, or both, may be automatically varied for any predetermined period of the drawing operation to overcome swelling or sinking of the cylinders at any localities or other defects evident from previous "draws." Thus, instead of a gradual increase of speed or air, I have apparatus for causing definite "speed and air" for any predetermined period.

My invention further provides an indicating scale for the guidance of unskilled workmen in adjusting the apparatus to overcome defects in subsequent drawing operations.

Specifically, my improvement consists, in part, in a swing-down drawing apparatus, constructed to swing down with or without the drawn cylinder. It further comprises speed and air controlling levers under subjection to automatic adjustment for any desired period of the operation, together with duplicate scales to indicate at what stage of the drawing operation defects have occurred, and adjustable elements to subsequently affect the controlling levers.

In said drawings, Figure 1 is a front elevation of my glass drawing apparatus.

Fig. 2 is a side elevation showing the measuring scale hereinafter referred to.

Fig. 3 is another side view of the apparatus, shown as applied to a suitable tank.

Fig. 4 is a top view of said apparatus.

Fig. 5 is a detail front elevation showing the connections between the bait and the drawing apparatus, also the automatic means for regulating the air pressure and drawing speed.

Fig. 5a is a modified form of the support for the pipe leading to the bait.

Fig. 6 is a side view showing my pivoted apparatus in its horizontal position after the cylinder has been lowered to such position and is ready for cutting.

Figs. 7 and 7a are detail sectional views of part of the connections between the air supply pipe and the pipe leading to the bait.

Figs. 8, 8a, and 8b are detail views of the automatic device for controlling the air pressure and drawing speed.

Figs. 9 and 9a represent modification of such automatic control means.

Fig. 10 is a detail view of the support for the pipe leading to the bait whereby said bait and the cylinder may freely swing in the taking-down movement.

Referring to Fig. 1 the frame work of my drawing apparatus is shown as comprising two upright standards 20 which are pivoted at their bases at 21 so as to be capable of tilting from the vertical position of Figs. 1 and 2 to the horizontal position of Fig. 6.

A spring 20' is provided between the upper end of the pivoted frame and some fixed part, to take up any shock when the frame is swung to its upper position. When the frame settles in that position the spring 20' is under slight compression and aids in easing the starting when the frame begins to swing down.

The drawing apparatus includes a traveling carriage 22 which has guide rollers 23 running between the vertical supports to guide the carriage in its vertical movements. The carriage is moved by means of a motor 24 having a worm gear connection 25, as shown in Fig. 2, with a windlass 26. Around this windlass extends a rope 27 which is attached to the carriage 22 so that the operation of the motor and windlass raises and lowers the carriage.

Over a stationary pulley 30 there extends a rope 31 which is attached to an arm 32 extending forward from the frame. The giving of slack on this rope 31 permits the entire frame to be tilted downward upon its pivotal points 21, until it assumes the horizontal position shown in Fig. 6 for any oblique position.

Referring to Fig. 1 again, the receptacle 33 containing the molten glass, is shown, with the glass cylinder 34 extending above the same in its drawn position. The bait 35 of any desired form, is connected by the air pipe 36, to a bent pipe 37. The left-hand end of this pipe 37 is hollowed out as shown in Fig. 10, so as to rest upon the rounded end of a pipe 38 carried by the drawing carriage. This mode of connection permits the bait 35 and its pipe 36 to oscillate freely upon this rounded bearing, somewhat like a universal joint. The purpose of this is to permit an oscillating movement of the bait and the cylinder when the apparatus is tilted and moved to its horizontal position. This permits a certain free movement of the glass cylinder during the taking-down proceeding.

In Fig. 5$^a$ a modified form of support for the bait is shown, where the pipe 36 is surmounted by a double bent pipe 37$^a$ having similar hollowed out construction resting upon the rounded ends of two pipes 38$^a$ which may be used as air supply pipes, permitting the bait to swing upon the upper ends of these pipes 38$^a$ as a pivot.

When the glass cylinder has been drawn upward vertically by the drawing carriage, to its full height, it is desirable to have some means for supporting the glass cylinder during its downward tilting movement. For this purpose I have provided arms 40 (see Fig. 1) which are pivoted to the right-hand side support 20 of the frame and are connected by an operating rod 41 which extends upward through the upper end of the framework and is normally spring-pressed upward by a spring 42. When the frame is in its upright position, the rounded head 43 of this rod 41, strikes the beveled edge of the plate 44 (see also Fig. 2) so as to depress the rod 41 downward against the tension of spring 42. This retains the supporting arms 40 in the position shown in Fig. 1. As soon as the downward tilting movement is begun however, the head 43 moves away from the beveled plate 44 and permits the spring to force the rod 41 upward, thereby carrying the arms 40 into the positions shown by dotted lines in Fig. 1. In such position these arms extend out into contact with the sides of the glass cylinder so as to support the cylinder in its downward tilting movement. Of course there may be as many of these arms as necessary for such support, and as described, they are automatically thrown into supporting position when the tilting movement takes place, and are kept out of supporting position when the framework is in its vertical position ready for drawing.

I may provide an automatic release for these supporting arms when the cylinder is about to reach horizontal position and be laid upon the usual horse or truck. This release consists of a cam 43' similar to the cam 43, and is indicated in Fig. 6. This cam pushes the rod 41, and this swings the pivoted arms into such position that the tilted frame may be raised past the cylinder, the arms being held in their swung position by any suitable means.

The air pipe 36 is yieldingly held by spring 36', Fig. 2, which tends to hold the bait and the pipe from tremor and shock when the frame is lowered. The spring 36' is between the braces 36$^2$ dependent from the bait carriage and the bait pipe, and is coiled about the stem of a yoke, the outer ends $x$ of which pass on each side of said pipe and thus keep it from successive lateral vibration. A second pair of pins $x'$ on the bait carriage 22, aids in this.

I provide automatic means whereby the drawing frame will adjust itself to suitable position in a vertical plane, that is, perpendicularly or to an oblique position. I mean that the drawing frame may be perfectly vertical or it may be at a slight angle from the vertical. The means provided for this are the horizontal spring 32$^a$, shown in Fig. 3, and the vertical spring 42, shown in the same figure and Fig. 1. The machine is normally held vertical, but if the glass should happen to pull to the front the machine, that is the drawing frame, is set at a slight angular position and vice versa. Compensation is thus provided and the cylinder maintained in proper drawing position during the draw.

In Fig. 3 this drawing apparatus is shown as applied to the form of movable tank shown in my patent above referred to. This tank 33 moves laterally from under the hood 50 so as to expose one of its drawing tanks for the operation of drawing. I show, however, the hood 50 arranged to slide so as to cover and uncover the tank 33 in my present construction. As soon as this drawing has taken place and the cylinder is of the requisite length, it is severed from the bath and the carriage fully elevated. The apparatus is then tilted to its horizontal position. The hood 50 is then shifted laterally to the right in Fig. 3, and a similar complement on the opposite side (not shown in Fig. 3), is similarly exposed on the opposite side of the hood where an exactly similar taker-down apparatus may be utilized in the same way. That is, after the drawing apparatus has been operated on one side to draw the cylinder and tilt to its lower position, the same operation may be proceeded with on the opposite side of the tank, while the cylinder on the first side is being cut up and removed. This effects a material saving of time and has other advantages as to economy and safety of operation.

There is also shown in Fig. 3 the electric source of current 51 in the shape of a generator which supplies current through the lead wires 52 to run the lifting motor 24. These lead wires 52 run up through the side support 20 to a point about half way up on the support, as shown in Fig. 1. From there on the lead wires are in the shape of a flexible cord 53 which extends upward to the drawing carriage 22 and thence to a rheostat shown on the left in Fig. 1. Lead wires then extend from this rheostat to the electric motor 24, said wires not being shown but being well understood as connecting with said motor for the purpose of operating said lifting motor from the main generating source. The purpose of the rheostat is to control the motor current and thus control the speed of lifting of the drawing carriage as presently will be explained.

The means whereby air may be led to or from the cylinder, under control, will now be discussed.

Air supply and suction control pipes 60 (Fig. 1) lead to a joint 61 common to or in line with joints 21 at the lower part of the taker-down apparatus. From there a vertical pipe 62 leads up to a central point of the frame, from whence a flexible tube 63 extends upward to a pipe 64 mounted on the drawing carriage 22. The purpose of the flexibility of the pipe 63 and of the aforesaid electric wires 53, is to permit the up and down movements of the drawing carriage and at the same time retain the connection of the electric wires and of the air supply pipes in any position of the carriage.

Irregularity of size and contour in the article being drawn is due often, if not generally, to vibrations or pulsations of the column or mass of air within the article or of that in the pipe leading to the interior of the article. Air is very sensitive to vibration or pulsation, and readily responds to the slightest impulse, of course. Each such response may be transmitted to the nascent walls of the cylinder at the place of genesis, where the walls are flaccid and sensitive. Such impulses may come from the wall, machinery, too sudden change of the air pressure, etc. By interrupting the vibrant continuity of the walls of the air conduit, so that tremors can not pass, I avoid much of this.

The aforesaid air pipe 64 is connected with a delivery pipe 65 which extends downward into proximity with a slip collar 66 which fits down over the upper end of the pipe 67 extending upward from a pipe 68 which is connected with the previously described pipe 38. The air control formed by collar 66, with its auxiliary parts 65 and 67 may replace one or both of the air controlling valves 60 or vice versa. In fact the parts 65, 66, 67, forming the air control, may be located at any desired point in the air conduit. This slip collar 66 is shown in detail in Figs. 7 and 7ª. It is attached to an arm 69 which is adjustably pinned to a cross arm 70. This cross arm 70 is at its other end attached to an arm 71 which extends downward to the rheostat arm 72. The arm 70 is pivoted at 70', and this pivot may be a valve arranged in the air conduit, as shown. From the center portion of the cross arm 70 an operating arm 73 extends upward, and is attached to a sliding arm 74 to the outer end of which is pinned the operating roller 75. This operating roller is acted upon by the beveled or cam-shaped heads 76 of adjustable pins 77 which are carried by the side support 20 of the frame.

The rheostat or regulator 72, as well as the collar 66 and valve 70, Fig. 1, may be directly and independently connected to an operating arm, as the one shown at 74. The valve might be used without the sliding collar. The location of the vent may be at any desired point between the compressed air supply and the bait itself. Other changes may readily be made.

In Fig. 8 a number of these pins 77 are shown and the operation of these parts is as follows:

When the drawing carriage 22 is lifted upward, the air pressure within the cylinder is controlled through the air pipes 62, 63, 64, and 65. In Fig. 1, the slip collar 66 is shown out of contact with the overlying pipe 65, but more or less air may be forced down through the pipe 65, into the pipes 65, 68, 38, 37 and into the interior of the glass cylinder. The depth to which the pipe 65 extends into the movable collar 66, as shown in Figs. 7 and 7ª, controls the effect of the air pressure or suction, as to the transmission of the same into the interior of the cylinder. That is, when the collar is in its lower position of Fig. 7ª, the effect would not be so pronounced as when the parts are more closely coupled as in Fig. 7.

Now the extent of movement or of coupling of the collar 66 to the pipe 65, is controlled by the rocking of the cross arm 70. When the right-hand end of the cross arm 70 (Fig. 1), is lifted, the collar 66 is lifted to make the air pressure more effective. Similarly the lowering of this right-hand end of the cross arm 70 puts the parts into position shown in Fig. 7ª, or Fig. 1, and correspondingly regulates the pressure.

Similarly as to the opposite end of said cross arm 70, the raising and lowering of the arm, operates through the arm 71 to control the rheostat 54, and this operates the motor 44 with greater or less speed. The result is thereby to cause the lifting of the drawing carriage at greater or less speed, which is a thing which has to be done in the drawing of cylinders in this manner to get the necessary conditions of thickness, etc., to the glass cylinder.

All this control of the air supply and drawing speed is automatically controlled by the carriage itself, according to its position. This takes place in the following manner: The adjustable pins 77 are set at different places on the supporting frame 20 and are screwed horizontally in or out, so as to bring their operating heads 76 into different alinement with the operating roller 75. Thus when said roller strikes one or the other of said cam heads 76, the arm 74 is automatically thereby adjusted horizontally. This moves the controlling arm 73 back and forth so as to rock the cross arm 70 about its central pivotal point.

Thus, when, after a draw, it is found that the cylinder walls are too thin or too thick, or the cylinder bulges or is depressed at certain points, the adjusting pins 77 may be set so as to contact with the roller 75 of the operating arm 74 and thus increase the degrees of speed of the motor and the consequent lifting speed of the drawing carriage, and likewise control the air pressure in the manner described.

In Figs. 9 and 9ª, a modified form of this automatic controlling device is shown, in the shape of a continuous flexible band 80 upon the opposite faces of which there impinge two rollers 81 connected with aforesaid operating arm 74. The vertical position of this band is controlled by adjustable set pins 82, so that the band may be given various shapes, one of which is shown in Fig. 9. Thus as the drawing carriage ascends, the flexible band 80 causes the rollers 81 to draw the arm 74 horizontally backward and forward to secure the necessary control of the lifting speed or the air pressure. It will of course be understood that the band 80 is intended to be of sufficient rigidity of structure to operate the controlling arm 74 in this manner but at the same time to be capable of flexion by the pins 82 for the purposes mentioned.

I have also devised a novel form of measuring scale for the purpose of locating points of correction necessary to be made in the drawing of the glass cylinder. When a cylinder has been drawn to its full height, it may be found that there is some defect at a certain point in the cylinder, which ought to or could be remedied by proper control of the motor speed or of the air pressure within the cylinder. The defect, if any, is formed, of course, in the genesis of the cylinder, at or near the surface of the glass, and it is not ordinarily easy to refer the occurrence of said defect to the proper moment of time in the period of cylinder formation, or what corresponds, to the distance of such occurrence from the carriage.

I have therefore provided this measuring scale, which is shown in Figs. 2 and 6. This scale 90 is carried upon the side support of the taker-down apparatus and comprises two sets of divisions consecutively running from opposite ends of the scale. As shown, one set of divisions appear as numbered from 1 to 24, on the right-hand side of the scale, beginning at the surface of the bath and extending to the extreme upper end of the drawing apparatus. A similar set of divisions but numbered in the opposite direction from 1 to 24 is made on the left hand side.

Thus if the cylinder has been drawn, the carriage is elevated until the wheel 75 reaches the top of the scale to its full height. If, when the apparatus with the cylinder thereon is lowered and the roller 75 has been brought opposite the top of the scale, it is found that a certain defect in the cylinder occurs at the point marked 4 on the right-hand scale, the workman notes the opposing number on the left-hand scale and sees that it is 21. He then adjusts pin 77 at 21 on the right-hand scale. This results in subsequently correcting the cylinders as to this defect by controlling the air or speed when the next cylinders are drawn to this extent since said roller 75 must have been opposite said mark 21, of the scale, when the defect occurred at or near the surface of the glass from which the cylinder was generated. I thus establish a relation of control between the walls of the cylinder in process of formation, and the speed of draw or feed of air. Any defect occurring in a preceding cylinder being indicated on the scale, points the way for the operator to adjust the cam, or otherwise alter conditions so that the speed of draw or flow of air may be changed to remedy the defect which necessarily occurred when the roller 75, was a certain distance, determined by the scale, from the surface of the glass, during the draw, and this defect generally occurs at the zone of formation of the cylinder. The defect may be a bulge, indraw, or thick or thin walls. Once adjusted, as stated, the apparatus may remedy the defect without changing the draw in other respects. The use of the scales may be reversed.

With the successive drawing of experimental cylinders, and locating the defects by this measuring scale, as in the manner described, the operator can soon readily overcome the various difficulties and eventually get the apparatus in shape to draw cylinders of the required degree of perfection.

It may be stated that the point of adjustment of the air supply pipe 60 at the pin 61, also the point of adjustment of the lead wires 52, to the taker-down frame, is at approximately the pivotal point 21 of said frame so that the tilting of the frame from vertical to horizontal position may take place without affecting these electric wires or air supply pipes.

Thus it will be seen that I have combined the drawing apparatus with the taker-down apparatus and have thereby entirely dispensed with any separate drawing apparatus which brings attendant difficulties and dangers in attempting to take down the glass cylinders after they have been drawn to their proper extent. Moreover my drawing apparatus is lowered to horizontal position at each operation and is thus away from the glass receptacle and is on the level of the floor within the reach of the operator where repair or other work may be performed on it with ease. The air pipe control is also arranged to permit of this combined action, as well as the control of the motor speed. Moreover the control of the air pressure is automatically governed by the drawing carriage as the drawing operation progresses.

One of the material advantages of the construction of the slip collar 66 above referred to is this, that ordinarily a very slight variation of the pneumatic pressure within the air cylinder will cause large fluctuations in the article drawn, whereas in my construction there is more or less surface friction and more or less escape of the air from this peculiar sort of joint, the result being that there may be a greater pressure or variation of pressure, which is only slightly communicated to the interior of the air in the cylinder. Thus considerable variations of the outside air pipe pressure, produce very slight changes in the pulsating pressure of the column of air within the glass cylinder. This gives a delicate and a pronounced and desirable result in the blowing process. This construction gives a sort of vent pressure for the purposes described.

I have shown two forms of devices, one for drawing glass from a pot, and the other for drawing glass from a tank. The latter is shown in Fig. 3. In this the lower portion of the frame is so constructed, and the angle is such that though fulcrumed outside the tank, the frame projects over the glass in the tank, as indicated at 20ª. One important feature which is characteristic of a frame of this shape, is that when the frame is lowered to horizontal position it will rest far enough away from the furnace to afford a safe distance from the drawing pot for further treatment of the glass.

While the forms of mechanism herein shown constitute a preferred form of embodiment of the improvements, it is to be understood that the invention is not limited to the precise details of construction herein shown and described but is capable of embodiment in other forms coming within the scope of the claims which follow.

What is claimed is as follows:

1. A glass drawing machine bodily tiltable between vertical and horizontal positions.

2. Glass drawing apparatus comprising a drawing element, a frame work upon which said element moves, said frame-work being bodily tiltable out of operative position to a position removed from the heat and gas updrafts from the source of drawing.

3. Glass drawing apparatus comprising a normally vertical framework, ways thereon upon which a drawing element may move in drawing, and a pivot at the bottom of said framework upon which said framework may be lowered to a horizontal position.

4. Glass drawing apparatus comprising a reciprocable glass drawing element, a framework upon which said glass drawing element is slidable in drawing and pivotally supported at its base and means for causing the retention of said frame-work at different positions of adjustment about such pivot.

5. Apparatus for drawing glass cylinders comprising a drawing element, a swing-down drawing frame and means for retaining the cylinder against jar in swinging down.

6. Apparatus for drawing glass cylinders comprising a drawing element, a lowerable frame for said element, ways upon said frame, and arms for supporting the cylinder drawn.

7. Glass drawing apparatus comprising a drawing element, a tiltable drawing apparatus for said element, and means automatically operable at an initial stage in the lowering of said frame for retaining the glass article against excessive relative movement on said frame.

8. Apparatus for drawing glass cylinders comprising a drawing element, a tiltable drawing apparatus for said element, and arms automatically operative at an initial stage in the lowering of said frame for retaining the glass article against relative movement thereon.

9. Glass drawing apparatus comprising a drawing element, a tiltable drawing apparatus for said element, and a swinging connection between said apparatus and said element.

10. A cylinder drawing apparatus comprising a bait raising device and, in combination with said device, means for automatically governing the speed of the bait raising at all times, said means being independently variable to affect speed during each portion of the upward path of the bait.

11. A cylinder drawing apparatus comprising a bait raising device and, in combination therewith, means for automatically governing the speed of the bait raising at all times, said means being independently variable to affect speed during each portion of the upward path of the bait, and means for automatically governing the flow of air into the cylinder being drawn, at all times during draw.

12. A cylinder drawing apparatus comprising a bait raising device and, in combination therewith, means for automatically governing the rate of flow of air into the cylinder being drawn at all times, said means being independently variable to affect air influx during each portion of the draw traverse.

13. Glass drawing apparatus comprising means for moving the drawing element, means for conducting the air under pressure thereto, levers controlling said two means, and elements for automatically controlling said levers, said elements being adjustable to vary the operation of said levers during any period of the drawing operation.

14. Glass drawing apparatus comprising a drawing element, a substantially universal hook support therefor, a tiltable frame, and ways upon said frame whereon said element may move.

15. Glass drawing apparatus comprising a drawing element, an air pipe formed in separated sections, and means for varying the relation of opposing ends of said sections to vary the air pressure, said means being in controlled relation with the walls of the cylinder being drawn.

16. Glass drawing apparatus, comprising a drawing element, an air pipe formed in two sections, a slip collar connecting said sections and variable as to position to vary the air pressure, and means whereby said variation may be automatically effected in response to the condition of the walls of the cylinder.

17. In a glass drawing apparatus, in combination, a frame, a drawing element, means for actuating said drawing element, a scale, and reciprocal scale on the frame, a variable adjustable device on the frame to which one of said scales is related for controlling the movement of the drawing element in engagement with said actuating means, the arrangement being such that with the drawing element in a given position, the position on one scale of any defect in a completed cylinder will indicate to the operator on the reciprocal scale the place for adjustment of the controlling device.

18. Glass forming apparatus comprising a stationary frame, a controllable adjustable glass forming element moving on said frame, a manually adjustable controller on said frame arranged in operative relation to the path of movement of said glass article forming element to control the air and speed, and thereby produce an article of predetermined form or shape-dimension.

19. In apparatus for drawing glass, drawing gear comprising a motor and a drawing carriage, a speed regulating device to regulate the speed of draw, said device including a variable cam pair, and connections whereby operation of the drawing gear may produce relative movement between the elements of the cam pair.

20. A cylinder drawing apparatus comprising a bait raising device and, in combination therewith, a speed regulating device to regulate the speed of draw at all times, said device including a variable cam pair, and connections whereby operation of the drawing gear may produce movement between the elements of the cam pair to affect speed during each portion of the upward path of the bait.

21. In apparatus for drawing glass having a drawing motor and a speed regulating device, the combination with a flexible strip cam, of a bar supporting the said strip, adjustable means connecting the strip to the bar for adjusting the distance between relatively opposite points in the said strip and bar, means operative to effect relative movement between the cam and speed regulating device whereby regulation of the speed of draw is effected.

22. In apparatus for drawing glass, the combination with a flexible strip cam of a bar supporting the said strip, adjustable means connecting the strip to the bar for adjusting the distance between relatively opposite points in the said strip and bar, a drawing carriage, a speed-varying device on said carriage, means operative to effect relative longitudinal movement between the flexible cam and the speed-varying device.

23. In apparatus for drawing glass, having a drawing motor and a speed regulating device, the combination with a flexible strip cam, of a bar supporting said strip, adjustable means connecting the strip to the bar for adjusting the distance between relatively opposite points in the strip and the bar, means operative to move the speed regulating device with reference to the cam, to control the speed regulating device.

24. In apparatus for drawing glass, the combination with a flexible strip cam of a bar supporting said strip, adjustable means connecting the strip to the bar for adjusting the distance between relatively opposite points in the strip and bar, a drawing carriage, a speed-varying device on said carriage, and means operative to move the speed-varying device with reference to the cam whereby the speed of the carriage may be regulated.

25. In apparatus for drawing glass, a drawing gear for drawing glass cylinders, means for supplying such cylinders as drawn with air, and means to regulate the air supply, said means including a variable cam pair, and connections whereby operation of the drawing device produces relative movements between the members of the cam pair to regulate influx of air.

26. In apparatus for drawing glass cylinders, drawing gear, air supplying means, means for regulating the speed of draw, and means for regulating air supply, both of said means including a cam pair, and connections whereby upward movement of the bait may produce relative movement between the elements of the cam pair to control the speed of draw and the rate of air supply.

27. In apparatus for drawing glass, the combination with a flexible strip cam of a bar supporting the said strip cam, adjustable means connecting the strip cam to the bar for adjusting the distance between relatively opposite points in the said strip cam and bar, a drawing carriage, a speed-changing device on said carriage, and means operative to move the bar and cam relatively to operate a valve in the air supply system.

28. In apparatus for drawing glass, the combination with a flexible strip cam of a bar supporting said cam, adjustable means connecting the strip cam to the bar for adjusting the distance between relatively opposite points in the strip cam and bar, a drawing carriage, a speed changing device mounted on said carriage, means operative to move the speed-changing device relatively to the cam, and coöperating with said cam to operate a valve in the air supply system.

29. Apparatus for taking down drawn glass cylinders comprising an element pivoted at its base, means for swinging and maintaining said element in any desired position from vertical to horizontal, said element being provided with yielding supports pivoted at an angle to said element for supporting the cylinder in the swinging down operation and during subsequent treatment.

30. In apparatus for drawing glass articles, in combination, a source of air supply, a conduit from said air supply having an outlet vent at the end, a conduit leading into the article being drawn, for blowing said articles, the entrance opening in said conduit being near the said vent, and means for varying the space or relative position of said vent and opening.

31. Glass forming apparatus provided with air pipes spaced in conductivity, and means for varying the relation of the pipes to vary the space and the air and thereby the air pressure within the article being formed.

32. In glass drawing apparatus, an air supply means, a conduit, said conduit being in two sections, one section leading from said air supply, another section leading to the article being drawn, and means for varying the mutual relation of the adjacent ends of the sections, to vary the pressure in blowing.

33. In glass drawing apparatus, in combination, an air supply means, a conduit, said conduit being in sections, one section being connected to said air supply means, a second section leading to the article being drawn, the free ends of said sections being arranged adjacent to each other, and a third section adapted to be adjusted to vary the mutual relation of the ends of the two first named sections so as to vary the pressure of the air passing through the conduit to the article being drawn.

34. In glass drawing apparatus, in combination, an air supply means, a conduit, said conduit being in sections, one section being connected to said air supply means, a second section leading to the article being drawn, the free ends of said sections being apart and arranged so that the openings in said ends are opposite each other, and means on one of said ends for controlling the opening between said ends whereby pressure of the air current passing through the conduit into the article, may be controlled.

35. In glass drawing apparatus, in combination, an air supply means, a conduit, said conduit being in sections, one section being connected to said air supply means, a second section leading to the article being drawn, the free ends of said sections being apart and arranged so that the openings in said ends are opposite each other, and means on one of said sections for controlling the pressure of the air passing through said conduit from one section to the other and into the article, whereby pressure in the article may be controlled.

36. In apparatus for drawing glass, in combination, a means for supplying air, a conduit, sections leading from said air supply, a conduit section leading to the interior of the article being drawn, the two conduits being so arranged that the discharge mouth of the first is opposite the entrance mouth of the second with an interval between them whereby a constant moving discharge of air from the first section is made to strike upon a resistant body of air in the second section and in the article being drawn, whereby pulsations of air in one section can not be communicated to the air in the other section.

37. The method of drawing glass articles free from defects due to vibration or pulsation, which consists in conducting air to the article being drawn, under such conditions that vibrant continuity of the air stream is interrupted.

38. In a device for drawing glass, in combination, a pivoted frame, a drawing carriage on said frame and a spring on said carriage to yieldingly support a bait when the pivoted frame, carrying a cylinder, is swung to horizontal.

39. A machine for drawing glass vertically comprising an element pivoted at its base and tiltable to positions between vertical and horizontal together with the drawn article, pivoted supports for the cylinder upon said pivoted drawing element and means for moving said support into cylinder supporting positions during the tilting operations, and removing said supports from said cylinder upon reaching horizontal positions, whereby the cylinder may be delivered from said pivoted element and thereby free the drawing element for a succeeding operation.

40. An apparatus for lowering drawn glass cylinders comprising a frame pivoted at its base, drawing apparatus on said frame, means for tilting and maintaining said frame in any position from vertical to horizontal, said element constructed to sustain the cylinder by the bait, and provided with supports pivoted at an angle to said element upon which the cylinder rests in the tilting down operation.

41. An apparatus for drawing glass cylinders comprising a frame pivoted at its base, drawing apparatus on said frame, supports on said frame for supporting the cylinder during the lowering operation, said supports being pivoted on the frame, a rod connecting said supports, a spring on the end of said rod, and on fixed parts of the apparatus, cams wherewith said rod engages for swinging said supports out of supporting position.

42. Glass drawing apparatus comprising a drawing element, a supporting means for said element, means whereby said drawing element may be moved along said supporting element, the said supporting element being movable to a position where all of its parts are accessible.

43. Glass drawing apparatus comprising a drawing element, a vertical framework upon which said element may be moved, said framework being movable out of vertical position to a position of accessibility.

44. Glass drawing apparatus comprising a drawing element, a normally vertical framework pivotally supported at the base, and means on said framework for guiding the drawing element during drawing.

45. Glass drawing apparatus comprising a reciprocable glass drawing element, a framework upon which said glass drawing element is mounted, said framework being pivotally supported at its base, and means whereby said framework may be lowered through an arc of 90° to a horizontal position or lifted to a vertical position or held at any inclination.

46. Apparatus for drawing glass cylinders comprising a drawing element, a swing down supporting frame, means on said frame for guiding upward movement of the drawing element, and means for retaining the cylinder against relative movement on said frame.

47. Apparatus for drawing glass cylinders comprising a drawing element, a lowerable frame for said element, means on said frame for guiding upward movement of the drawing element, and arms for embracing the cylinder drawn.

48. Glass drawing apparatus comprising a drawing element, a tiltable frame for said element, ways for said element on the frame, and a swinging connection between said frame and said element.

49. Glass drawing apparatus, comprising a frame, a drawing element, on said frame, means for raising and lowering said element, air supply means, an adjustable controller arranged in effective relation to the path of movement of said raising and lowering means, and a device traveling with said raising and lowering means and in engagement with said controller, to control the speed of draw in response to variations of said controller determined in advance to produce a draw of predetermined form or dimensions.

50. Glass drawing apparatus, comprising a frame, a drawing element on said frame, means for raising and lowering said element, air supply means, an adjustable controller arranged in effective relation to the path of movement of said raising and lowering means, and a device traveling with said raising and lowering means and in engagement with said controller, to control the supply of air in response to variations of said controller determined in advance to produce a draw of predetermined form or dimensions.

51. Glass drawing apparatus comprising a frame, a drawing element, on said frame, means for raising and lowering said element, air supply means, an adjustable controller arranged in effective relation to the path of movement of said raising and lowering means, and a device traveling with said raising and lowering means and in engagement with said controller for controlling the speed of draw and supply of air in response to variations of said controller determined in advance to produce a draw of predetermined form or dimensions.

52. Glass drawing apparatus, comprising a frame, a glass drawing device on said frame, means for operating said device, an adjustably contoured cam arranged near said drawing device, an arm extending from said drawing device and contacting with said cam, to control movement of said drawing device in response to variations of said contour determined in advance from a preceding draw to compensate for irregularities of performance of the drawing device.

53. A glass drawing apparatus, comprising a glass drawing element, an adjustable cam for controlling the drawing, a framework, means for raising and lowering said element on the framework, and a double column scale arranged in connection with said framework one of said columns being the invert duplicate of the other, the opposite figures of the double scale always equaling the same sum, whereby from the position of any defect in a cylinder, the position as read on the scale, may enable the determination of the position of the drawing head at the occurrence of the defect, and also enable the adjustment of said cam to cure said defect.

54. A machine for treating glass articles comprising a tilting frame, drawing and regulating means mounted upon said frame, stationary coöperating means for maintaining said frame and drawing and regulating means in suitable position for drawing, and means for moving said frame and drawing means to or from the said means, above the glass.

55. Glass drawing apparatus, comprising a drawing element, a frame on which said element may move, said frame being adjustable to perpendicular or oblique position, and means whereby said frame may be maintained so as to have the drawing element in desired position for drawing.

In testimony whereof I affix my signature in the presence of two subscribing witnesses.

ARTHUR E. SPINASSE.

Witnesses:
W. A. HOSACK,
B. E. CHARLTON.

Copies of this patent may be obtained for five cents each, by addressing the "Commissioner of Patents, Washington, D. C."